United States Patent
Zannella et al.

(10) Patent No.: US 11,731,836 B1
(45) Date of Patent: Aug. 22, 2023

(54) DUAL DRIVE LINK CONVEYORS AND METHODS FOR CHORDAL COMPENSATION

(71) Applicant: The Gillette Company LLC, Boston, MA (US)

(72) Inventors: Christopher Luigi Zannella, Peabody, MA (US); Donald William Loughlin, Natick, MA (US); Gregory Scott Geihsler, Roswell, GA (US); Colin Grant Dickerson, Derry, NH (US); Sven Leonard Swanson, Erie, PA (US); Michael Buckholtz, Erie, PA (US); Kevin Michael Cedzo, Fairview, PA (US)

(73) Assignee: The Gillette Company LLC, Boston, MA (US)

( * ) Notice: Subject to any disclaimer, the term of this patent is extended or adjusted under 35 U.S.C. 154(b) by 0 days.

(21) Appl. No.: 17/861,760

(22) Filed: Jul. 11, 2022

(51) Int. Cl.
*B65G 21/22* (2006.01)
*B65G 23/38* (2006.01)
(Continued)

(52) U.S. Cl.
CPC .............. *B65G 21/22* (2013.01); *B65G 17/08* (2013.01); *B65G 17/30* (2013.01); *B65G 17/40* (2013.01);
(Continued)

(58) Field of Classification Search
CPC ........ B65G 21/22; B65G 17/08; B65G 17/30; B65G 17/40; B65G 23/06; B65G 23/36;
(Continued)

(56) References Cited

U.S. PATENT DOCUMENTS 3,980,173 A * 9/1976 Riggs ................. B65G 21/2018
474/215
4,825,999 A * 5/1989 Hammer ................ B65G 23/06
198/834
(Continued)

FOREIGN PATENT DOCUMENTS

| DE | 102012104213 A1 * | 11/2013 | ............. B65G 23/00 |
| DE | 102015107113 A1 * | 7/2016 | ............. B65G 17/22 |
| DE | 202019005871 U1 * | 1/2023 | ............. B65G 17/08 |

OTHER PUBLICATIONS

"Patent Translate Description DE102015107113A1", EPO (Year: 2023).*
"Patent Translate Description DE102015107113A1" (Year: 2023).*

*Primary Examiner* — Mark A Deuble
(74) *Attorney, Agent, or Firm* — John M. Lipchitz

(57) ABSTRACT

A link conveyor for an assembly machine and methods for chordal compensation in a link conveyor, may include a first upper chordal compensation cam in the upper rail assembly at the first end of the frame to deflect the chain by a first upper variable deflection amount; a first lower chordal compensation cam in the lower rail assembly at the first end of the frame to deflect the chain by a first lower variable deflection amount; and configuring the first upper variable deflection amount and the first lower variable deflection amount to reduce deviation between a first velocity of the chain at the first end of the frame and a second velocity of the chain at the second end of the frame.

20 Claims, 16 Drawing Sheets

(51) Int. Cl.
*B65G 17/30* (2006.01)
*B65G 23/44* (2006.01)
*B65G 17/08* (2006.01)
*B65G 17/40* (2006.01)
*B65G 23/06* (2006.01)
*B65G 23/36* (2006.01)

(52) U.S. Cl.
CPC .............. *B65G 23/06* (2013.01); *B65G 23/36* (2013.01); *B65G 23/38* (2013.01); *B65G 23/44* (2013.01); *B65G 2812/02089* (2013.01); *B65G 2812/02287* (2013.01)

(58) Field of Classification Search
CPC .................... B65G 23/38; B65G 23/44; B65G 2812/02089; B65G 2812/02287
See application file for complete search history.

(56) References Cited

U.S. PATENT DOCUMENTS 10,124,960 B2 * 11/2018 Menke .................... B65G 23/44
10,589,935 B2 * 3/2020 Ragan .................... B65G 23/08

* cited by examiner

DUAL DRIVE LINK CONVEYORS AND METHODS FOR CHORDAL COMPENSATION

FIELD

The present disclosure relates generally to link conveyors for assembly machines and more specifically to providing chordal compensation in link conveyors.

BACKGROUND

Precision link conveyors are a common mechanism for transporting products through an assembly process at high speed and with high positional accuracy. Single-motor precision link conveyors are used on many types of assembly machines. A single-motor precision link conveyor typically includes a frame, a chain made of precision metal links to which product holding nests can be attached, guide rails to locate the precision links, a drive pulley or sprocket, an end pulley or sprocket, and a drive motor. These systems are very effective but have the drawback that the number of indexes per minute of the conveyor must decrease the longer the machine gets because the mass of the chain increases beyond the torque capability of the motor. This problem limits how long the conveyor can be, which in turn limits the number of operations that can be accomplished on the assembly machine using that conveyor. A need, therefore, exists for longer link conveyors.

Another problem is that the linear speed of the chain changes as the links rotate around the end pulleys, due to each straight link not conforming to the curve of the pulley or sprocket, which is referred to herein as a chordal effect. A need, therefore, exists for improved chordal compensation to balance the chain velocity at both ends of a link conveyor.

The discussion of shortcomings and needs existing in the field prior to the present disclosure is in no way an admission that such shortcomings and needs were recognized by those skilled in the art prior to the present disclosure.

SUMMARY

Various embodiments provide longer link conveyors and/or improved chordal compensation. For example, various embodiments relate to a link conveyor for an assembly machine. The link conveyor may comprise a frame having a first end and a second end. An upper rail assembly may be supported by the frame. The upper rail assembly may comprise a first upper rail and a second upper rail. The upper rail assembly may define an upper channel. Similarly, a lower rail assembly may be supported by the frame and may comprise a first lower rail and a second lower rail. The lower rail assembly may define a second channel. The first channel and the second channel may be configured, positioned, and/or sized to accommodate a chain comprising a plurality of links.

The link conveyor may comprise a first sprocket, positioned at the first end of the frame and engaging the chain. A first motor may drivingly engage the first sprocket. Similarly, the link conveyor may comprise a second sprocket, positioned at the second end of the frame and engaging the chain. Various embodiments solve the problem of the linear speed of the chain links changing as the links rotate around the sprockets, due to a straight link not conforming to the curve of the sprocket. This change in speed causes increased forces and vibration in the chain, limiting its speed and locational accuracy. Deviations between a first velocity of the chain at the first end of the frame and a second velocity of the chain at a second end of the frame may be reduced by including one or more chordal compensation cams in the upper rail assembly and/or in the lower rail assembly.

Due to the reduced deviation between the first velocity and the second velocity, the link conveyor may also comprise a second motor drivingly engaging the second sprocket. When the second motor is present, the link conveyor may comprise a controller. The controller may comprise a processor and a memory. The controller may be configured to adjust the second motor to drive the second sprocket at about the second velocity, which may be selected or calculated to match or to approximate the first velocity as nearly as possible, thereby further reducing the deviation between the first velocity and the second velocity.

These and other features, aspects, and advantages of various embodiments will become better understood with reference to the following description, figures, and claims.

BRIEF DESCRIPTION OF THE DRAWINGS

Many aspects of this disclosure can be better understood with reference to the following figures.

Figure 1:
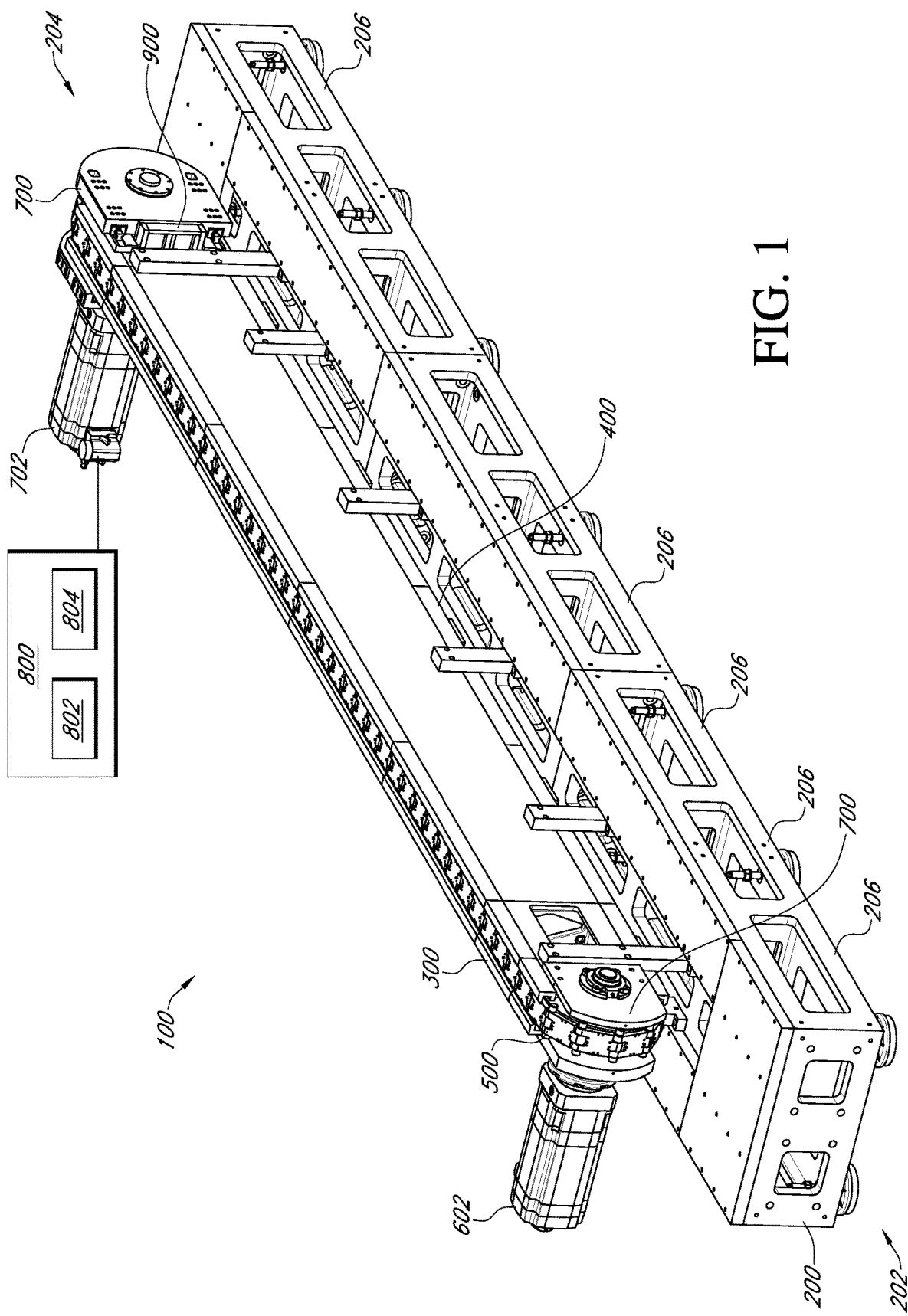
FIG. 1 is an example according to various embodiments illustrating a perspective view of a link conveyor.

It should be understood that the various embodiments are not limited to the examples illustrated in the figures.

DETAILED DESCRIPTION

Introduction and Definitions

This disclosure is written to describe the invention to a person having ordinary skill in the art, who will understand that this disclosure is not limited to the specific examples or embodiments described. The examples and embodiments are single instances of the invention which will make a much larger scope apparent to the person having ordinary skill in the art. Unless defined otherwise, all technical and scientific terms used herein have the same meaning as commonly understood by the person having ordinary skill in the art. It is also to be understood that the terminology used herein is for the purpose of describing examples and embodiments only, and is not intended to be limiting, since the scope of the present disclosure will be limited only by the appended claims.

All the features disclosed in this specification (including any accompanying claims, abstract, and drawings) may be replaced by alternative features serving the same, equivalent, or similar purpose, unless expressly stated otherwise. Thus, unless expressly stated otherwise, each feature disclosed is one example only of a generic series of equivalent or similar features. The examples and embodiments described herein are for illustrative purposes only and that various modifications or changes in light thereof will be suggested to the person having ordinary skill in the art and are to be included within the spirit and purview of this application. Many variations and modifications may be made to the embodiments of the disclosure without departing substantially from the spirit and principles of the disclosure. All such modifications and variations are intended to be included herein within the scope of this disclosure. For example, unless otherwise indicated, the present disclosure is not limited to particular materials, reagents, reaction materials, manufacturing processes, or the like, as such can vary. It is also to be understood that the terminology used herein is for purposes of describing particular embodiments only and is not intended to be limiting. It is also possible in the present disclosure that steps can be executed in different sequence where this is logically possible.

All numeric values are herein assumed to be modified by the term "about," whether or not explicitly indicated. The term "about" generally refers to a range of numbers that one of skill in the art would consider equivalent to the recited value (for example, having the same function or result). In many instances, the term "about" may include numbers that are rounded to the nearest significant figure.

In everyday usage, indefinite articles (like "a" or "an") precede countable nouns and noncountable nouns almost never take indefinite articles. It must be noted, therefore, that, as used in this specification and in the claims that follow, the singular forms "a," "an," and "the" include plural referents unless the context clearly dictates otherwise. Thus, for example, reference to "a support" includes a plurality of supports. Particularly when a single countable noun is listed as an element in a claim, this specification will generally use a phrase such as "a single." For example, "a single support."

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

In this specification and in the claims that follow, reference will be made to a number of terms that shall be defined to have the following meanings unless a contrary intention is apparent.

As used herein, the term "disposed on" refers to a positional state indicating that one object or material is arranged in a position adjacent to the position of another object or material. The term does not require or exclude the presence of intervening objects, materials, or layers.

Various embodiments provide a modular, precision link conveyor that can be driven by either one or two servo motors. If a shorter, lower speed, or less expensive machine is needed, a single motor drive may be chosen. If a longer, or higher speed machine is required, two motor drives can be chosen. The design is such that a second drive may quickly and easily be mounted to a single drive conveyor to create a double-drive conveyor. Similarly, the second drive may be quickly and easily removed from a double-drive conveyor to create a single drive conveyor. The conveyor frame design is such that sections can be added or removed to change the length of the conveyor and additional chain links can be added or removed to match the length of the frame.

The modular, precision link conveyor driven by two servo motors according to various embodiments may operate quickly and precisely without causing excess vibration. The nature of a precision link conveyor is that the linear speed of the chain links change as the links rotate around the end pulleys because the straight links do not conform to the curve of the end sprockets. This change in speed causes increased forces and vibration in the chain, limiting its speed and locational accuracy. Various embodiments employ chordal compensation cams to adjust the linear speed of the links entering and exiting the end sprockets to reduce deviations between chain velocity at opposite ends of the link conveyor and/or to match the speed of the links in the straight section of the conveyor.

When a second drive motor is added to the other end of the conveyor, a moving sprocket replaces what would otherwise be fixed guide. The second sprocket will not move at the same instantaneous rotational velocity as the first sprocket, because the chordal effect of the links slightly changes the rotational speed of the second sprocket. This can cause the second motor to oppose the first motor in some instantaneous positions, increasing forces and vibration. Various embodiments correct for the chordal effect of the straight links to reduce vibration and provides a custom speed profile for the second motor to match the actual speed that the links experience from being driven by the first motor. This allows the two motors to share the load, allowing a speed and conveyor length increase, without adding extra forces and vibration into the system.

To provide an overview, FIGS. 1-16 will be referenced generally; individual figures and groups of figures are discussed hereinafter. Various embodiments relate to a link conveyor 100 for an assembly machine. The link conveyor 100 may comprise a frame 200 having a first end 202 and a second end 204. An upper rail assembly 300 may be supported by the frame 200. The upper rail assembly 300 may comprise a first upper rail 306 and a second upper rail 308. The upper rail assembly 300 may define an upper channel 302. Similarly, a lower rail assembly 400 may be supported by the frame 200 and may comprise a first lower rail 406 and a second lower rail 408. The lower rail assembly 400 may define a second channel 402. The first channel 302 and the second channel 402 may be configured, positioned, and/or sized to accommodate a chain 500. The upper channel 302 and the lower channel 402 may, therefore, cooperatively receive the chain 500.

The frame 200 may comprise a plurality of modular subunits 206. Each modular subunit 206 may support one or more segments of the upper rail assembly 300 and one or more segments of the lower rail assembly 400 to allow the link conveyor 100 to support a chain 500 of any length. it is to be understood that, while a modular design is typically preferable, the frame and the rail assemblies may also be of unitary design.

The link conveyor 100 may comprise a first sprocket 600, positioned at the first end 202 of the frame 200 and engaging the chain 500. A first motor 602 may drivingly engage the first sprocket 600. On the first end 202 of the conveyor 100, a precision drive hub may guide the chain 500 around the end 202 of the conveyor 100. The drive hub may be connected to a precision gear reducer, which in turn may be connected to a servo motor 702 that mounts to the conveyor frame 200. The servo motor 702 may be capable of rotating the drive hub to any number of precisely defined motion profiles to achieve programmable precision motion of the conveyor chain 500.

Similarly, the link conveyor 100 may comprise a second sprocket 700, positioned at the second end 204 of the frame 200 and engaging the chain 500. According to some embodiments, the link conveyor may also comprise a second motor 702 drivingly engaging the second sprocket 700. The second motor 702 may be optional. When the second motor 702 is present, the link conveyor may comprise a controller 800. The controller 800 may comprise a processor 802 and a memory 804. The controller 800 may be configured to adjust the second motor 702 to drive the second sprocket 700 at about the second velocity, which may be selected or calculated to match or to approximate the first velocity.

Figure 8:
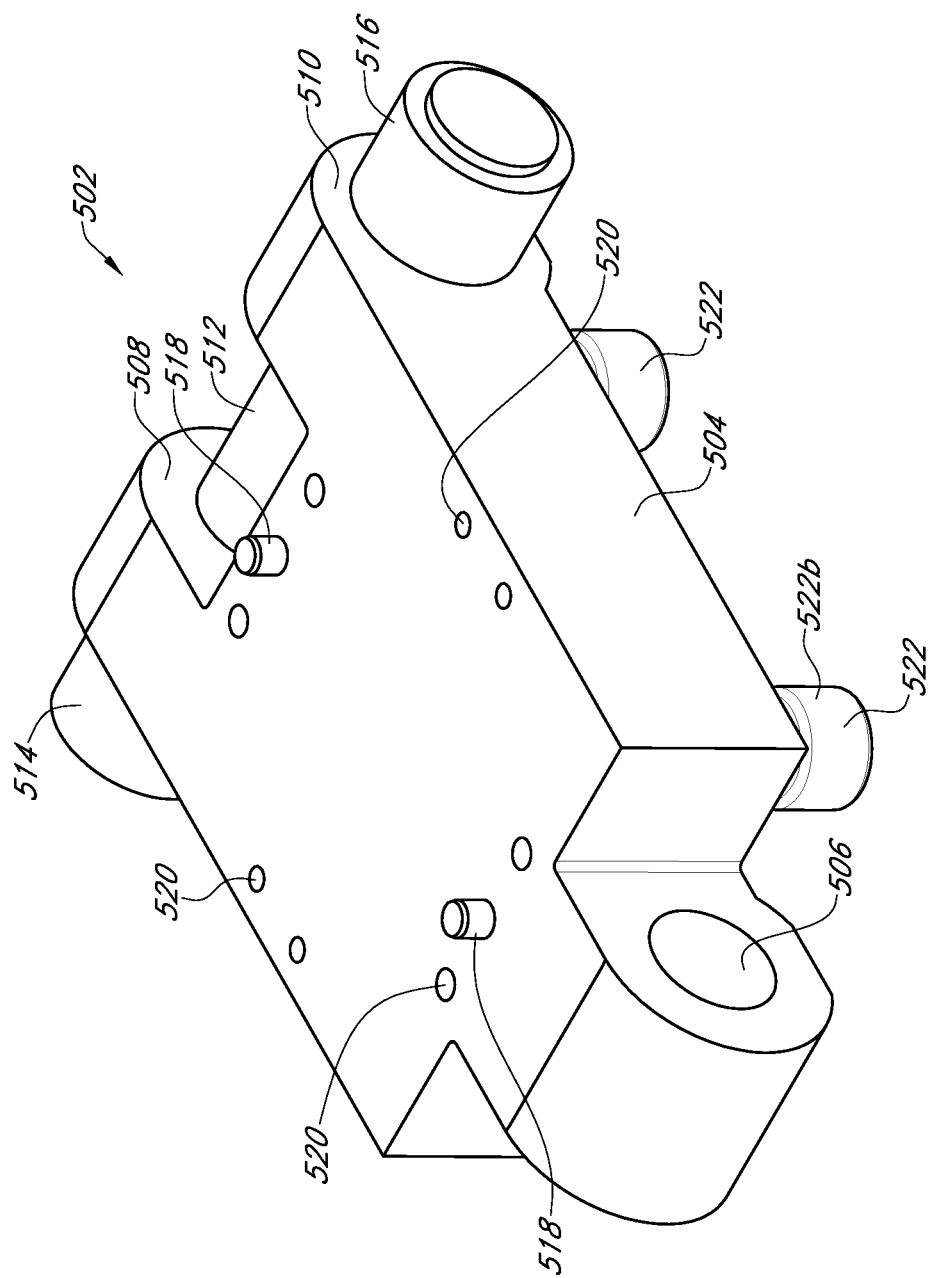
FIG. 8 is an example according to various embodiments illustrating a perspective view of a single chain link.

The chain 500 may comprise a plurality of interconnected links 502. A single link 502 is shown in FIG. 8. Each link may have a body 504 with a first bearing 506, a second bearing 508, and a third bearing 510 disposed therein. The plurality of links 502 may be interconnected via a plurality of link pins 512 disposed in the bearings 506, 508, 510. Each of the plurality of link pins 512 may comprise a first roller 514 and a second roller 516 sized to roll within the upper channel 302 and the lower channel 402.

Deviations between the first velocity and the second velocity may be reduced by including one or more chordal compensation cams. The chordal compensation cams 304, 316, 404, 416 may be mounted at the exit or entrance of one or both end sprockets 600, 700. According to various embodiments, the deviation between the first velocity of the chain 500 at the first end 202 of the frame 200 and the second velocity of the chain 500 at the second end 204 of the frame 200 may be reduced to about 0% to about 1% of the first velocity, or to about 0.1% to about 0.9%, or to about 0.2% to about 0.8%, or to about 0.3% to about 0.7% or to about 0.4% to about 0.5% of the first velocity.

The upper rail assembly 300 may comprise a first upper chordal compensation cam 304, positioned at the first end 202 of the frame 200. The first upper chordal compensation cam 304 may comprise a first upper deflection surface 310 disposed on the first upper rail 306 and a second upper deflection surface 312 disposed on the second upper rail 308. The first upper deflection surface 310 and the second upper deflection surface 312 may cooperate to deflect the chain 500 by a first upper variable deflection amount 314. According to various embodiments, the first upper deflection surface 310 and the second upper deflection surface 312 may cooperate to deflect the chain 500 toward the lower rail assembly 400 by the first upper variable deflection amount 314. Similarly, the lower rail assembly 400 may comprise a first lower chordal compensation cam 404, positioned at the first end 202 of the frame 200. A first lower chordal compensation cam 404 may be provided at the exit end of the fixed drive sprocket 600 to provide a straight link path on the high-tension side of the conveyor and to eliminate the need for an expansion joint in the linear guide rails 300, 400. The first lower chordal compensation cam 404 may comprise a first lower deflection surface 410 disposed on the first lower rail 406 and a second lower deflection surface 412 disposed on the second lower rail 408. The first lower deflection surface 410 and the second lower deflection surface 412 may cooperate to deflect the chain 500 by a first lower variable deflection amount 414. According to various embodiments, the first lower deflection surface 410 and the second lower deflection surface 412 may cooperate to deflect the chain 500 toward the upper rail assembly 300 by the first lower variable deflection amount 414. The first upper variable deflection amount 314 and the first lower variable deflection amount 414 may be configured to reduce a deviation between a first velocity of the chain 500 at the first end 202 of the frame 200 and a second velocity of the chain 500 at the second end 204 of the frame 200.

The upper rail assembly 300 may comprise a second upper chordal compensation cam 316, positioned at the second end 204 of the frame 200. The second upper chordal compensation cam 316 may comprise a third upper deflection surface 318 disposed on the first upper rail 306 and a fourth upper deflection surface 320 disposed on the second upper rail 308. The third upper deflection surface 318 and the fourth upper deflection surface 320 may cooperate to deflect the chain 500 by a second upper variable deflection amount 322. According to various embodiments, the third upper deflection surface 318 and the fourth upper deflection surface 320 may cooperate to deflect the chain 500 toward the lower rail assembly 400 by the second upper variable deflection amount 322. Similarly, the lower rail assembly 400 may comprise a second lower chordal compensation cam 416, positioned at the second end 204 of the frame 200. The second lower chordal compensation cam 416 may comprise a third lower deflection surface 418 disposed on the first lower rail 406 and a fourth lower deflection surface 420 disposed on the second lower rail 408. The third lower deflection surface 418 and the fourth lower deflection surface 420 may cooperate to deflect the chain 500 by a second lower variable deflection amount 422. According to various embodiments, the third lower deflection surface 418 and the fourth lower deflection surface 420 may cooperate to deflect the chain 500 toward the upper rail assembly 300 by the second lower variable deflection amount 422. The second upper variable deflection amount 322 and the second lower variable deflection amount 422 may further reduce the deviation between the first velocity of the chain 500 at the first end 202 of the frame 200 and the second velocity of the chain 500 at the second end 204 of the frame 200.

The link conveyor may further comprise a moveable carriage 900 slidably disposed at the second end 204 of the frame 200. The moveable carriage 900 may support the second sprocket 700 and the second motor 702, when the second motor 702 is present. Therefore, the moveable carriage 900 may allow the position of the second sprocket 700 and the second motor 702 to be adjusted. The moveable carriage 900 may be adjustably biased toward the moveable carriage 900, and thereby the second sprocket 700 and the second motor 702 may also be biased in a direction away from the first sprocket 600 and the first motor 602. Biasing the moveable carriage 900 away from the first end 202 and toward the second end 204 may add tension to the chain 500.

On the second end 202 of the conveyor frame 200, the moveable carriage 900 may be coupled to the frame 200 with linear rolling element bearings. This carriage 900 may support either a second servo motor 702 driving a second drive hub, or a fixed guide to guide the chain 500 around the second end 204 of the conveyor 100. A settable force can be applied to this carriage 900 via a spring or an air cylinder, to generate the proper tension in the chain 500 to prevent the link pins 502 from rattling or changing sides in the machine direction MD in the link bearings 506, 508, 510 during acceleration and deceleration of the chain 500. The second servo motor 702 may be mounted to the moving carriage 900. A precision gear reducer may be coupled to the output of the second servo motor 702. A second drive hub may be coupled to the output of the second gear reducer. The second servo motor 702 may be controlled by a controller 800 that is programmed to match the rotational velocity of the links entering and exiting the sprocket 700 based on the speed they are driven by the first servo motor 602.

Figure 2:
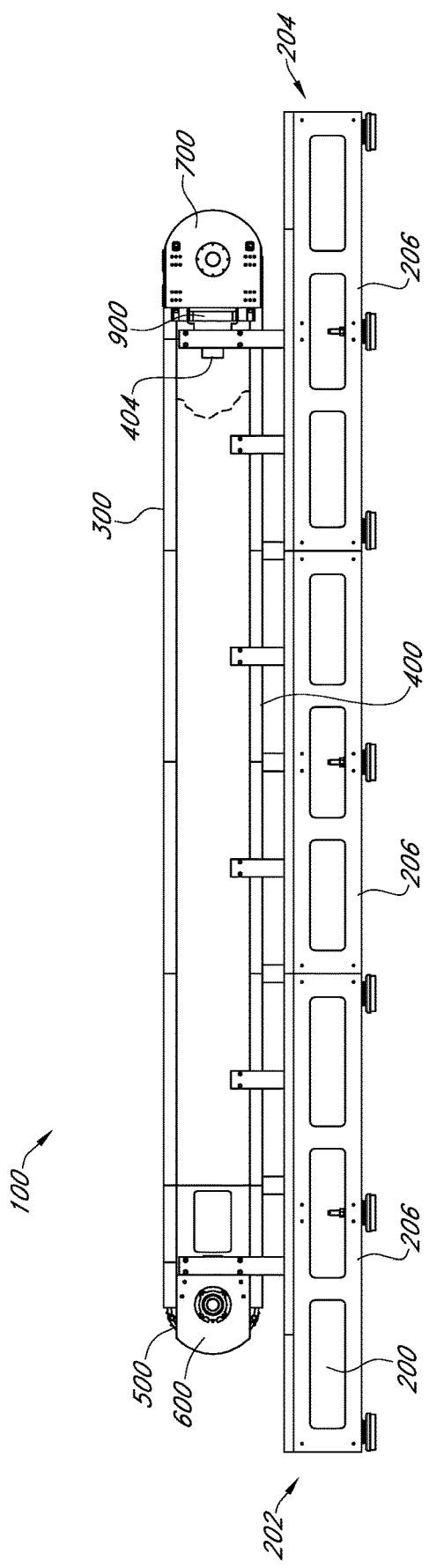
FIG. 2 is an example according to various embodiments illustrating a side view of a link conveyor.
Figure 3:
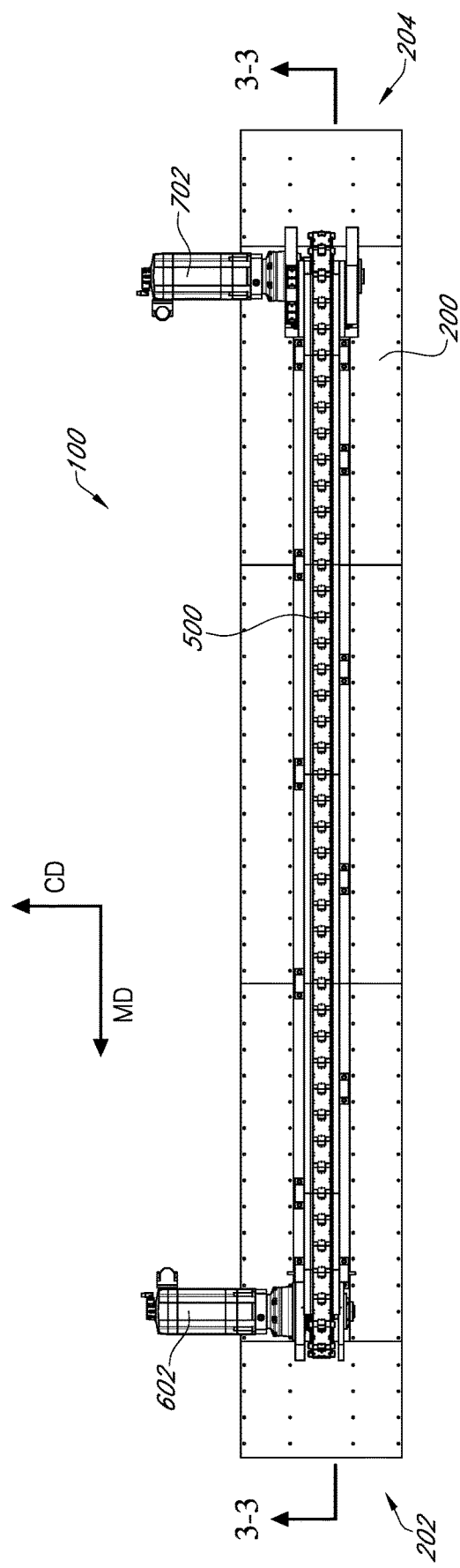
FIG. 3 is an example according to various embodiments illustrating a top view of a link conveyor.

FIGS. 1, 2, and 3 are examples according to various embodiments respectively illustrating a perspective view, a side view, and a top view of a link conveyor 100. The link conveyor 100 comprises a frame 200 having or defining a first end 202 and a second end 204. The frame comprises a plurality of modular subunits 206 that may be linked together to provide a supporting structure of any desirable size. The frame 200 may support an upper rail assembly 300 and a lower rail assembly 400, which may be provided in a plurality of segments. The upper rail assembly 300 and the lower rail assembly 400 may cooperate to support a chain 500. The frame 200 may also support first sprocket 600 and a second sprocket 700 about which the chain 500 winds in an engaging relationship. The first sprocket 600 may be driven by a first motor 602. The second sprocket 700 may be driven by a second motor 702. The speed of the second motor 702 may be controlled by a controller 800 comprising a processor 802 and a memory 804. As already discussed, the controller may be configured to adjust the speed of the second motor 702 to cause a second velocity of the chain 500 at the second end 204 to match or to approximate a first velocity of the chain 500 at the first end 202.

Figure 4:
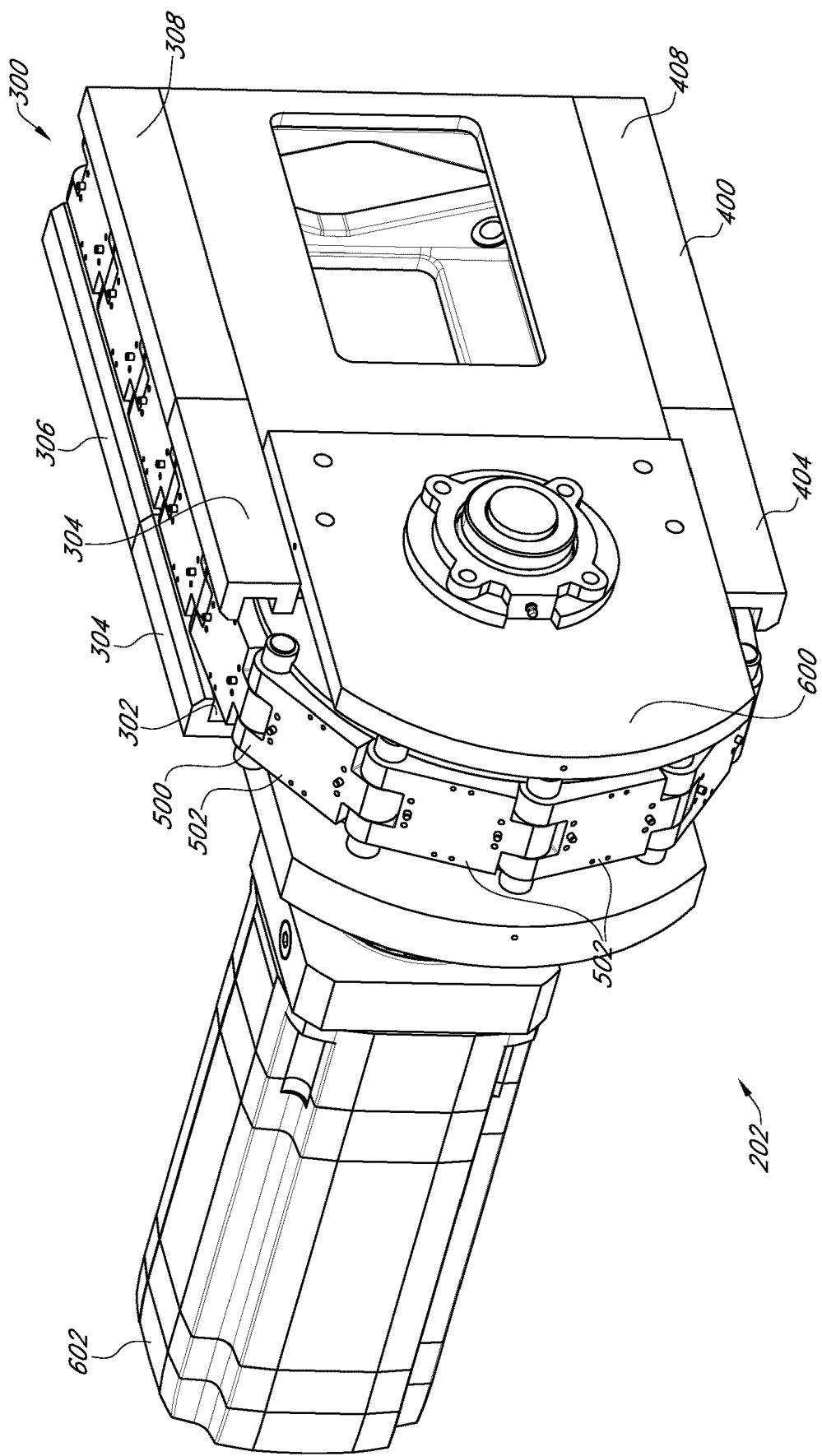
FIG. 4 is an example according to various embodiments illustrating a perspective view of certain components at a first end of a link conveyor.
Figure 5:
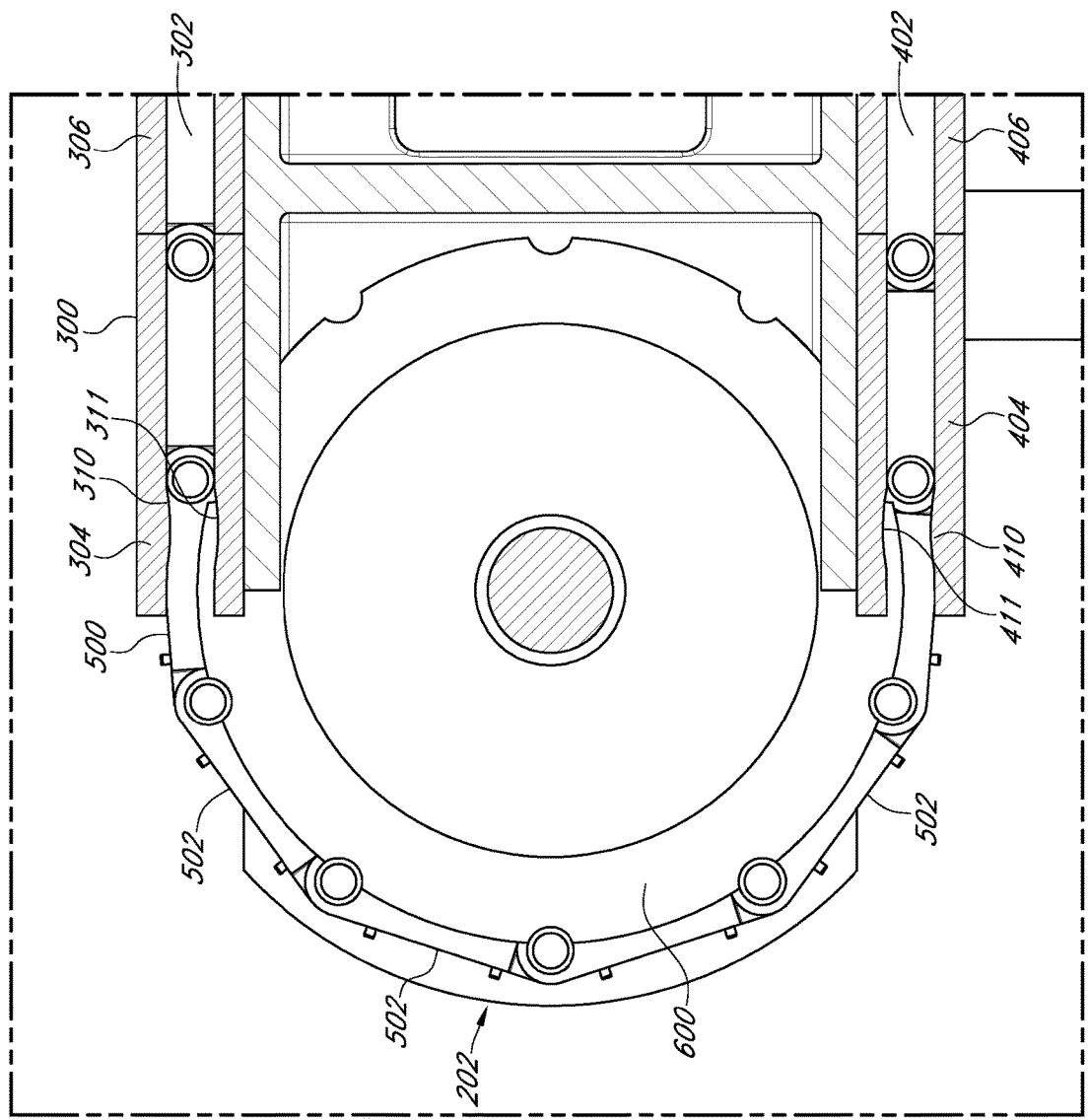
FIG. 5 is an example according to various embodiments illustrating a partial cross-section view taken along line 3-3 as shown in FIG. 3 of certain components at a first end of a link conveyor.
Figure 6:
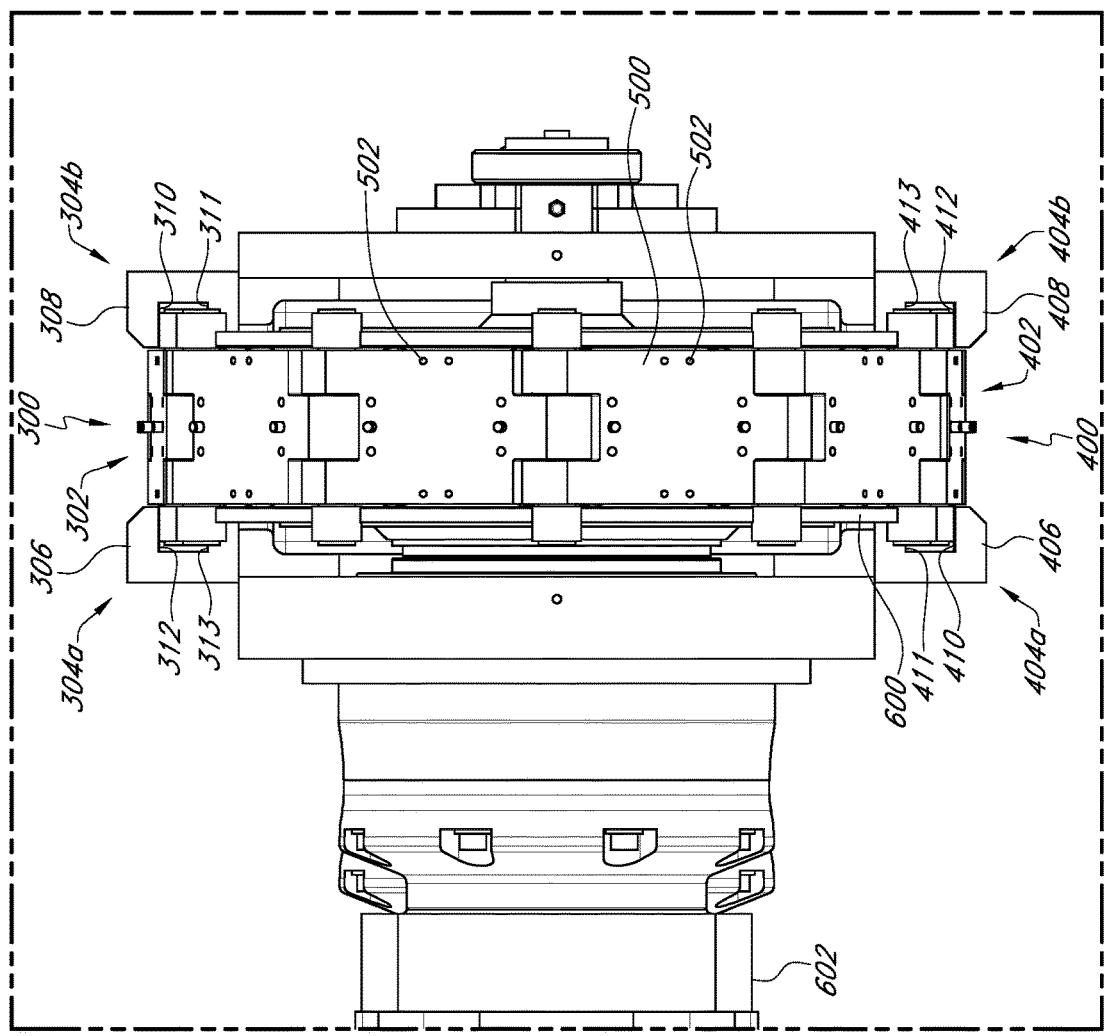
FIG. 6 is an example according to various embodiments illustrating a partial end view of certain components at a first end of a link conveyor.

FIGS. 4, 5, and 6 are examples according to various embodiments respectively illustrating a perspective view, a partial cross-section view taken along line 3-3 of FIG. 3, and a partial end view of certain components at a first end 202 of a link conveyor 100. The upper rail assembly 300 may include a first upper rail 306 and a second upper rail 308 that define an upper channel 302. The lower rail assembly 400 may include first lower rail 406 and a second lower rail 408 that define a lower channel 402. The upper channel 302 may be configured to receive and to support a chain 500, comprising a plurality of links 502. The chain may engage a first sprocket 600, which may be driven by a first motor 602.

Figure 15:
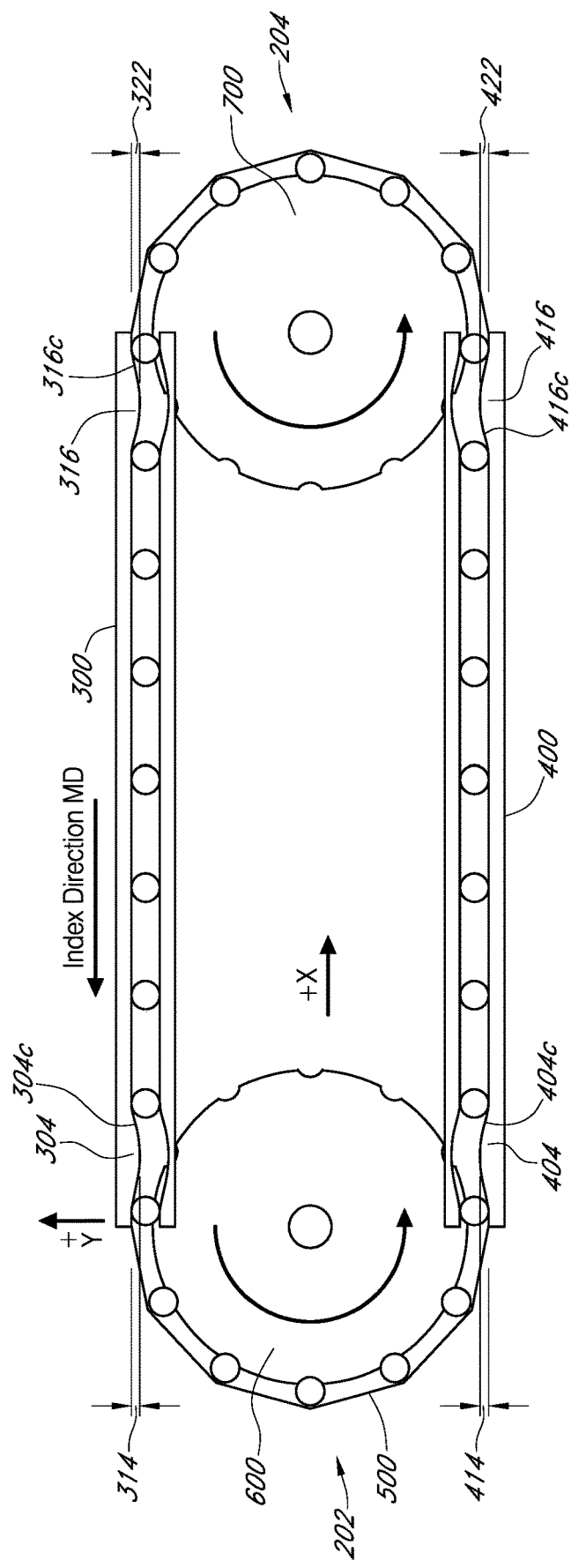
FIG. 15 is an example according to various embodiments illustrating a schematic diagram of a link conveyor.

The upper rail assembly 300 may comprise a first upper chordal compensation cam 304 defined by a first section 304a in the first upper rail 306 and a second section 304b in the second upper rail 308. The first section 304a may comprise a first upper deflection surface 310 comprising a curved protrusion deviating from the otherwise straight path of the first upper rail 306. The first section 304a may further comprise a first upper concave surface 311 corresponding to and cooperating with the first upper deflection surface 310. The second section 304b may comprise a second upper deflection surface 312 comprising a curved protrusion deviating from the otherwise straight path of the second upper rail 308. The second section 304b may further comprise a second upper concave surface 313 corresponding to and cooperating with the second upper deflection surface 312. The first upper deflection surface 310 and the second upper deflection surface 312 may deflect the chain 500 by a first upper variable deflection amount 314, as illustrated in FIG. 15. The first upper concave surface 311 and the second upper concave surface 312 may cooperate in this deflection of the chain 500 by providing space into which the chain 500 may be deflected. The first upper chordal compensation cam 304, or each of the first section 304a and the second section 304b thereof, may have a cross-sectional geometry 304c.

Similarly, the lower rail assembly 400 may comprise a first lower chordal compensation cam 404 defined by a first section 404a in the first lower rail 406 and a second section 404b in the second lower rail 408. The first section 304a may comprise a first lower deflection surface 410 comprising a curved protrusion deviating from the otherwise straight path of the first lower rail 406. The first section 404a may further comprise a first lower concave surface 411 corresponding to and cooperating with the first lower deflection surface 410. The second section 404b may comprise a second lower deflection surface 412 comprising a curved protrusion deviating from the otherwise straight path of the second lower rail 408. The second section 404b may further comprise a second lower concave surface 413 corresponding to and cooperating with the second lower deflection surface 412. The first lower deflection surface 410 and the second lower deflection surface 412 may deflect the chain 500 by a first lower variable deflection amount 414, as illustrated in FIG. 15. The first lower concave surface 411 and the second lower concave surface 412 may cooperate in this deflection of the chain 500 by providing space into which the chain 500 may be deflected. The first lower chordal compensation cam 404, or each of the first section 404a and the second section 404b thereof, may have a cross-sectional geometry 404c.

Figure 7:
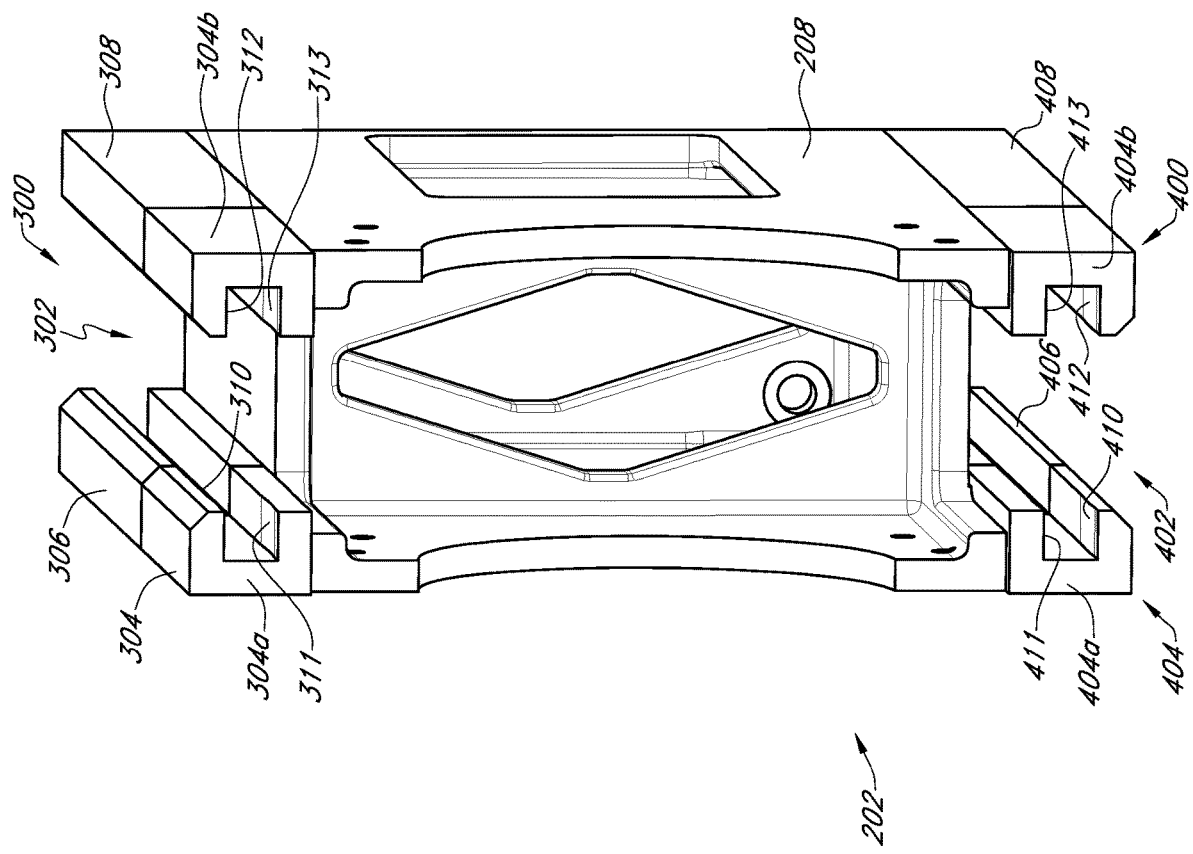
FIG. 7 is an example according to various embodiments illustrating a perspective view of an upper and lower rail assembly at a first end of a link conveyor.

FIG. 7 is an example according to various embodiments illustrating a perspective view of an upper rail assembly 300 and lower rail assembly 400 at a first end 202 of a link conveyor 100. As shown, first end support 208 may support and interconnect the first upper chordal compensation cam 304, comprising a first section 304a and a second section 304b, and the first lower chordal compensation cam 404, comprising a first section 404a and a second section 404b. The first end support 208 may also support and interconnect at least a segment of the first upper rail 306, at least a segment of the second upper rail 308, at least a segment of the first lower rail 406, and at least a segment of the second lower rail 408. The first end support 208 may be integral with or may be a modular subcomponent of the frame 200.

FIG. 8 is an example according to various embodiments illustrating a perspective view of a single chain link 502 of the chain 500, which may include a plurality of links 502 that may be interconnected. As shown, each link 502 may have a body 504. The body may comprise a plurality of bearings. For example, the body may include a first bearing 506, a second bearing 508, and a third bearing 510. A link pin 512 may be disposed through the first bearing 506 of a first link 508 and through a second bearing 508 and a third bearing 510 of a second link 502 to interconnect the first link 502 and the second link 502. Each link may comprise a first roller 514 and a second roller 516, which may be configured to ride along the horizontal surfaces of the upper channel 302 and the lower channel 402, as well as to engage the first sprocket 600 and the second sprocket 700. The first roller 514 and the second roller 516 may also engage the chordal compensation cams 304, 316, 404, 416 to deflect the chain 500 by the variable deflection amounts 314, 322, 414, 422. Each link may also include one or more stabilizers 522, which may restrict movement of the chain 500 in a cross-direction CD (see FIG. 3) by riding along the vertical surfaces of the upper channel 302 and the lower channel 402. The stabilizers 522 may comprise rollers 522b to reduce friction along the vertical surfaces. The stabilizers 522 may be adjustable in a vertical direction, for example via the tightening or loosening of a hex screw. Each link 502 may comprise one or more features to accommodate a nest (not shown). The nest may be any desirable tool or holding apparatus, as is known in the art. The nest may be mounted one or more links 502 via nest mounting pins 518 and/or nest mounting holes 520.

Figure 9:
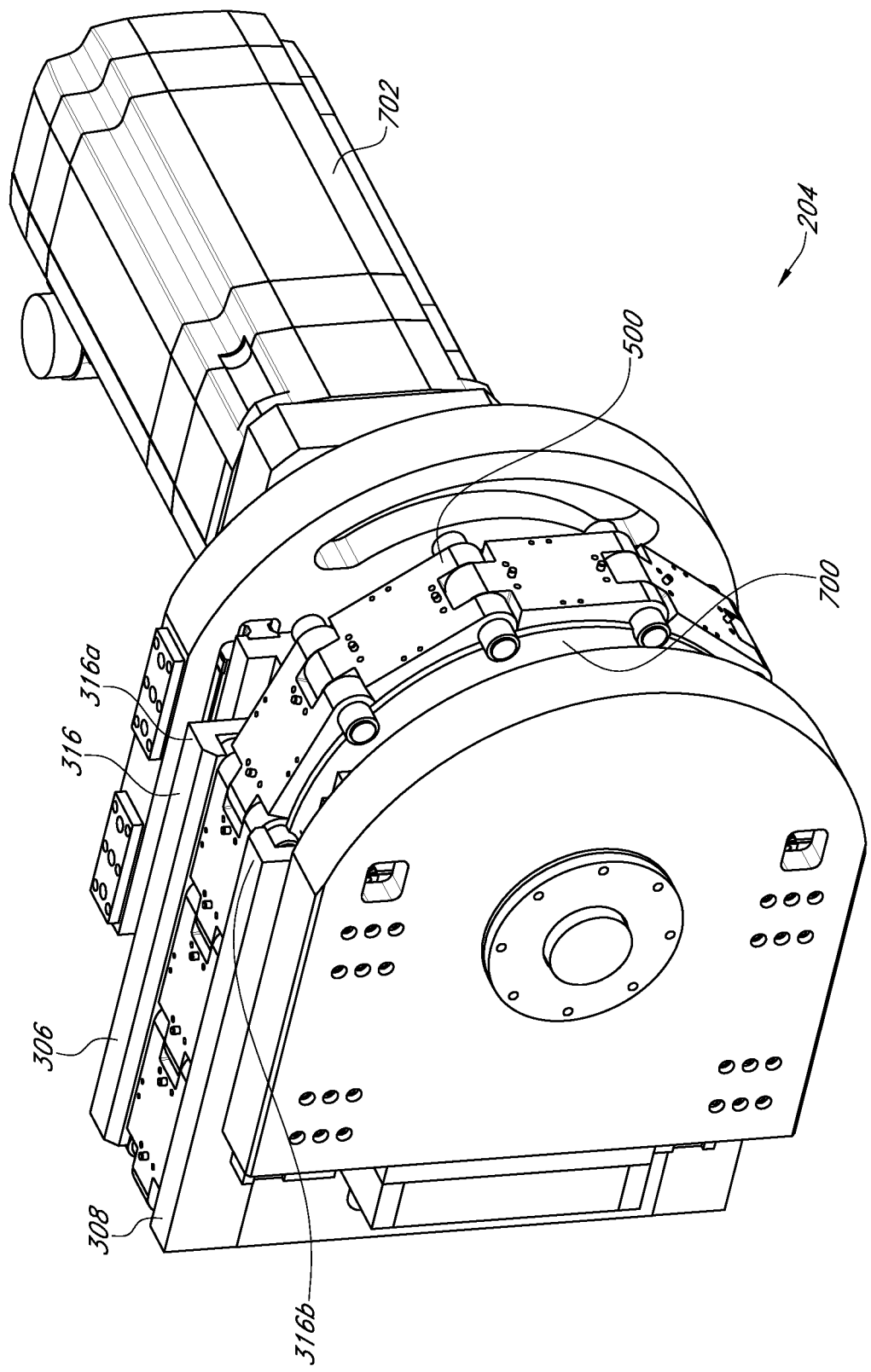
FIG. 9 is an example according to various embodiments illustrating a perspective view of certain components at a second end of a link conveyor.
Figure 10:
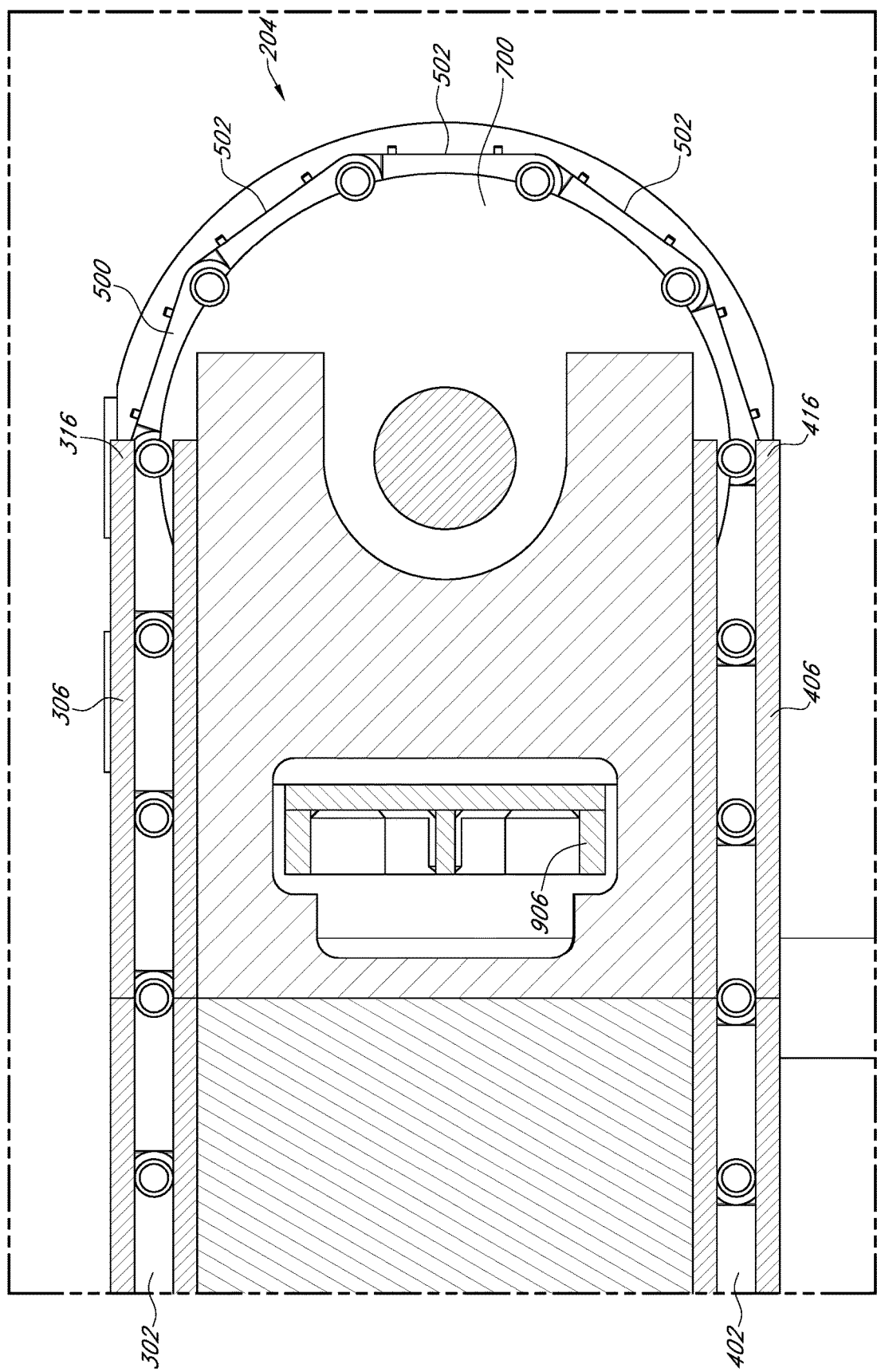
FIG. 10 is an example according to various embodiments illustrating a partial cross-section view taken along line 3-3 as shown in FIG. 3 of certain components at a second end of a link conveyor.
Figure 11:
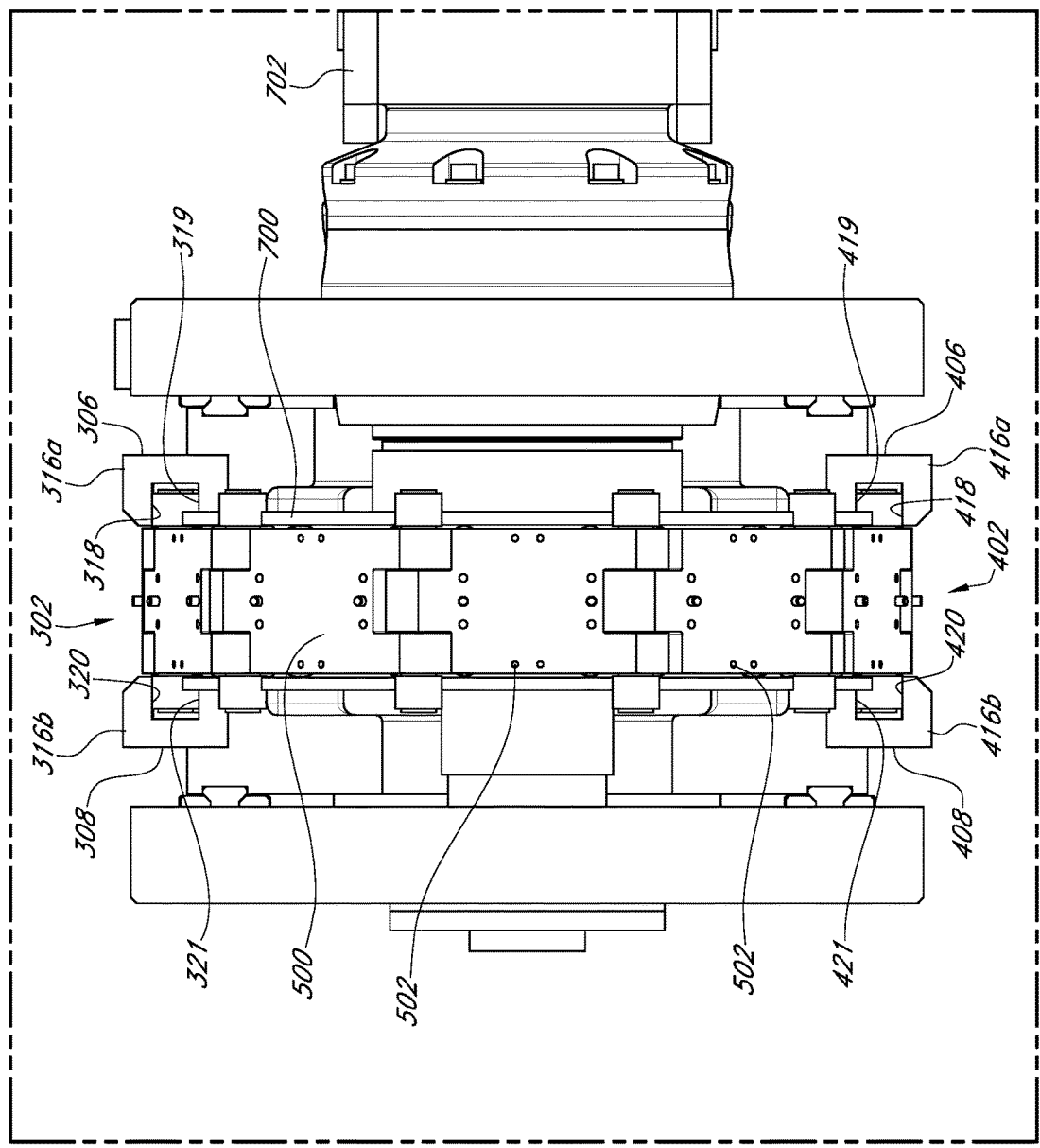
FIG. 11 is an example according to various embodiments illustrating a partial end view of certain components at a second end of a link conveyor.

FIGS. 9, 10, and 11 are examples according to various embodiments respectively illustrating a perspective view, a partial cross-section view taken along line 3-3 of FIG. 3, and a partial end view of certain components at a second end 204 of a link conveyor 100. The upper rail assembly 300 may comprise a second upper chordal compensation cam 316 defined by a first section 316a in the first upper rail 306 and a second section 316b in the second upper rail 308. The first section 316a may comprise a third upper deflection surface 318 comprising a curved protrusion deviating from the otherwise straight path of the first upper rail 306. The first section 316a may further comprise a third upper concave surface 319 corresponding to and cooperating with the third upper deflection surface 318. The second section 316b may comprise a fourth upper deflection surface 320 comprising a curved protrusion deviating from the otherwise straight path of the second upper rail 308. The second section 316b may further comprise a fourth upper concave surface 321 corresponding to and cooperating with the fourth upper deflection surface 320. The third upper deflection surface 318 and the fourth upper deflection surface 320 may deflect the chain 500 by a second upper variable deflection amount 322, as illustrated in FIG. 15. The third upper concave surface 319 and the fourth upper concave surface 321 may cooperate in this deflection of the chain 500 by providing space into which the chain 500 may be deflected. The second upper chordal compensation cam 316, or each of the first section 316a and the second section 316b thereof, may have a cross-sectional geometry 316c.

Similarly, the lower rail assembly 400 may comprise a second lower chordal compensation cam 416 defined by a first section 416a in the first lower rail 406 and a second section 416b in the second lower rail 408. The first section 416a may comprise a third lower deflection surface 418 comprising a curved protrusion deviating from the otherwise straight path of the first lower rail 406. The first section 416a may further comprise a third lower concave surface 419 corresponding to and cooperating with the third lower deflection surface 418. The second section 416b may comprise a fourth lower deflection surface 420 comprising a curved protrusion deviating from the otherwise straight path of the second lower rail 408. The second section 416b may further comprise a fourth lower concave surface 421 corresponding to and cooperating with the fourth lower deflection surface 420. The third lower deflection surface 418 and the fourth lower deflection surface 420 may deflect the chain 500 by a second lower variable deflection amount 422, as illustrated in FIG. 15. The third lower concave surface 419 and the fourth lower concave surface 421 may cooperate in this deflection of the chain 500 by providing space into which the chain 500 may be deflected. The second lower chordal compensation cam 416, or each of the first section 416a and the second section 416b thereof, may have a cross-sectional geometry 416c.

Figure 12:
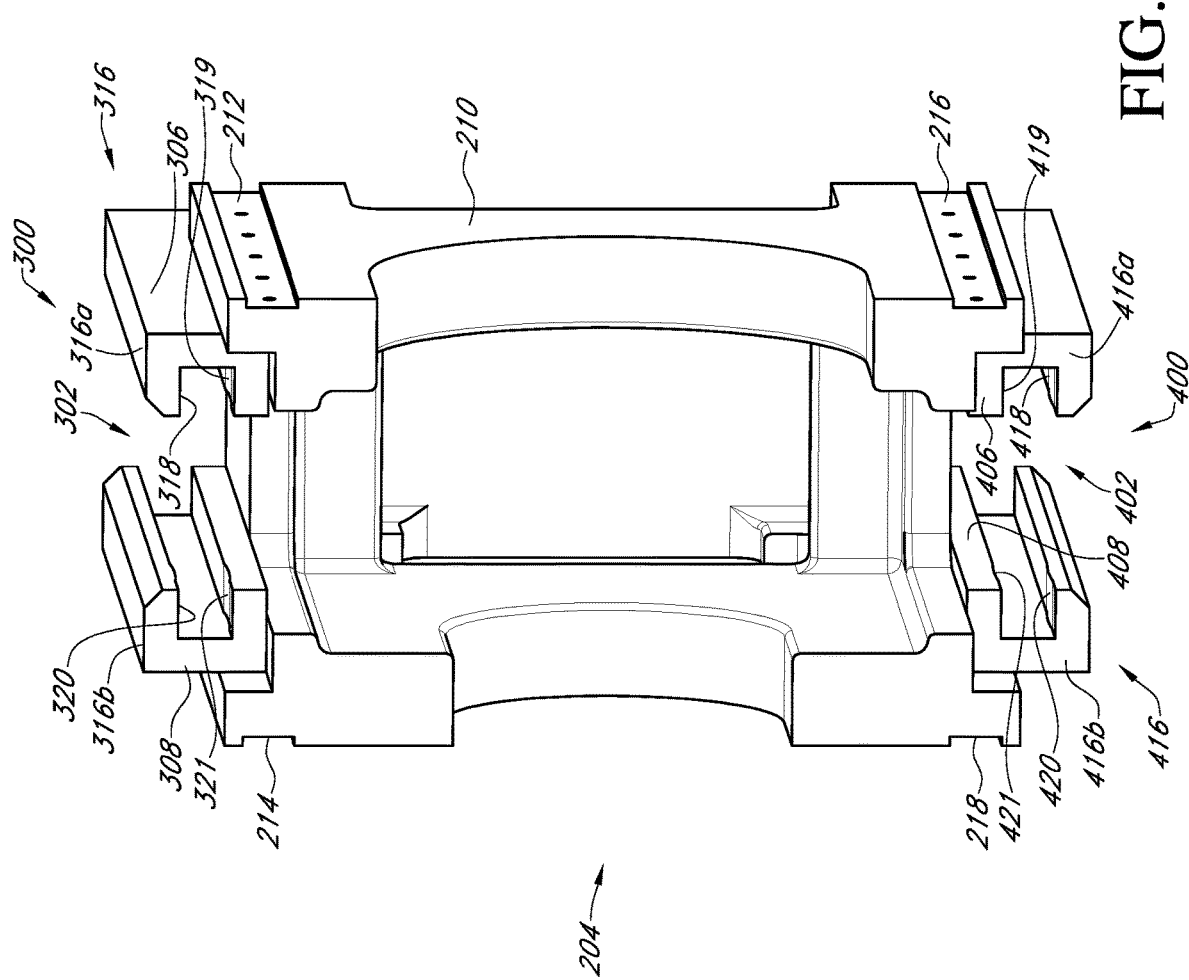
FIG. 12 is an example according to various embodiments illustrating a perspective view of an upper and lower rail assembly at a second end of a link conveyor.

FIG. 12 is an example according to various embodiments illustrating a perspective view of an upper rail assembly 300 and lower rail assembly 400 at a second end 204 of a link conveyor 100. As shown, second end support 210 may support and interconnect the second upper chordal compensation cam 316, comprising a first section 316a and a second section 316b, and the second lower chordal compensation cam 416, comprising a first section 416a and a second section 416b. The second end support 210 may also support and interconnect at least a segment of the first upper rail 306, at least a segment of the second upper rail 308, at least a segment of the first lower rail 406, and at least a segment of the second lower rail 408. The second end support 210 may be integral with or may be a modular subcomponent of the frame 200. The second end support 210 may further comprise a plurality of carriage channels to support and to engage a moveable carriage 900. For example, the second end support 210 may include a first upper carriage channel 212, a second upper carriage channel 214, a first lower carriage channel 216, and a second lower carriage channel 218.

Figure 13:
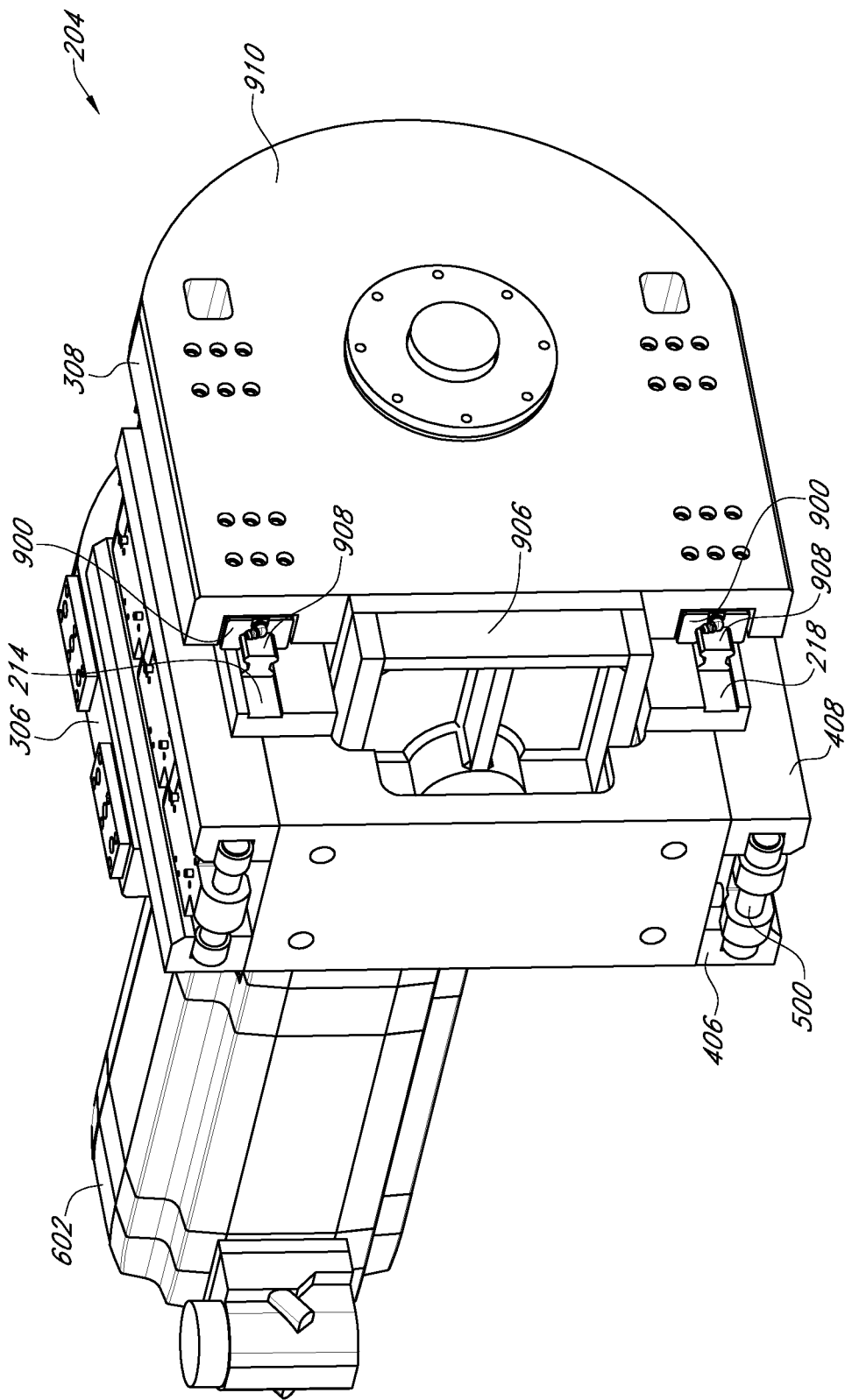
FIG. 13 is an example according to various embodiments illustrating a perspective view of certain components at a second end of a link conveyor.
Figure 14:
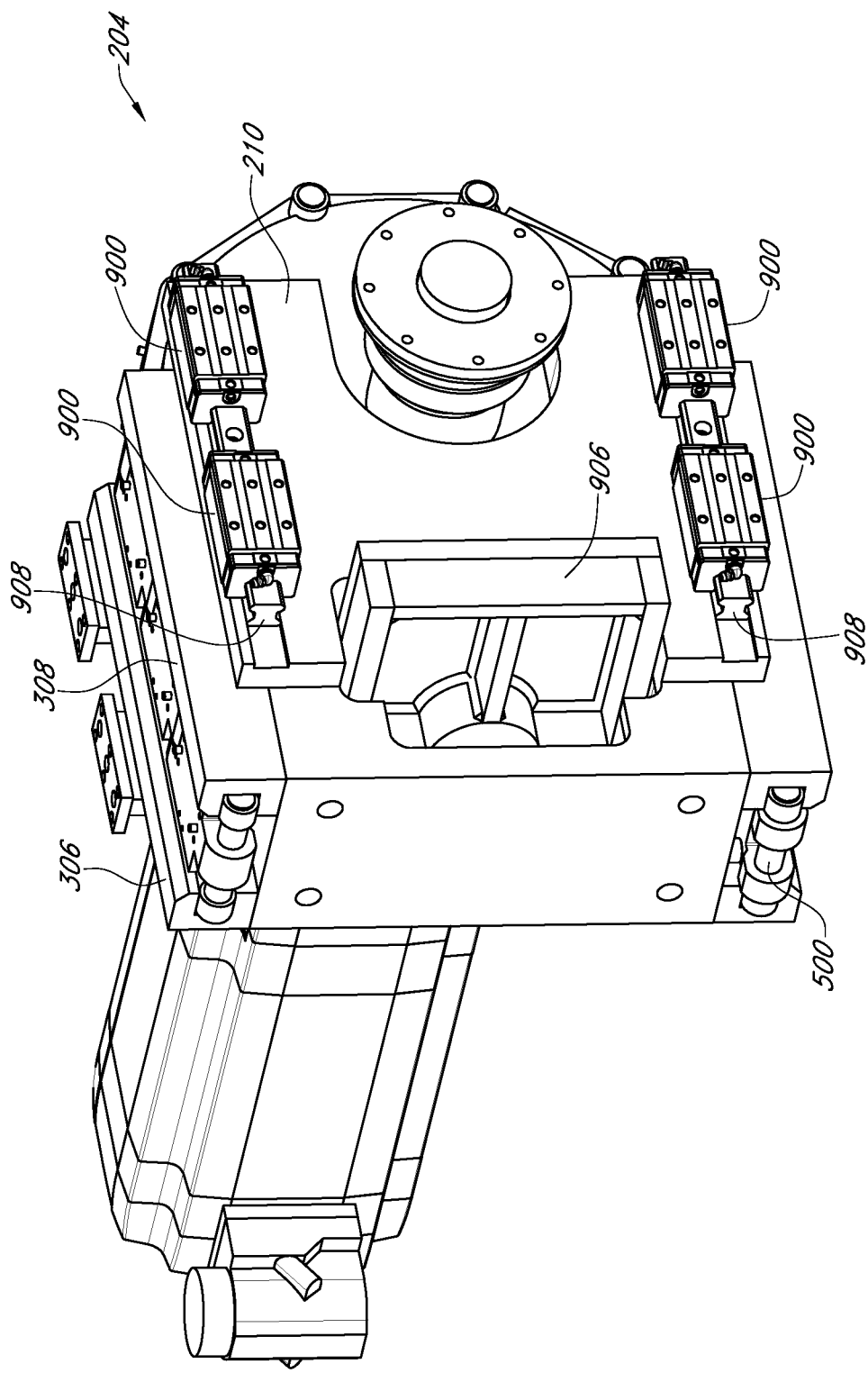
FIG. 14 is an example according to various embodiments illustrating a perspective view of certain components at a second end of a link conveyor.

FIGS. 13 and 14 are examples according to various embodiments illustrating perspective views of certain components at a second end 204 of a link conveyor 100. As shown, a moveable carriage 900 may comprise a plurality of carriage tracks 908 that engage with the plurality of carriage channels 212, 214, 216, 218 of the second end support 210. A removable outer body 910 is shown in FIG. 13 but is removed in FIG. 14. The removable outer body 910 may be secured to the moveable carriage 900 during operation. The outer body 910 may be biased to move the moveable carriage by causing the carriage tracks 908 to slide within the carriage channels 212, 214, 216, 218 of the second end support 210.

Various embodiments relate to a method for chordal compensation in a link conveyor 100. The link conveyor 100 may comprise a frame 200 having a first end 202 and a second end 204; an upper rail assembly 300, supported by the frame 200 and defining an upper channel 302; a lower rail assembly 400, supported by the frame 200 and defining a lower channel 402. The upper channel 302 and the lower channel 402 may cooperate to receive a chain 500. The link conveyor 100 may further comprise a first sprocket 600, positioned at the first end 202 of the frame 200 and engaging the chain 500 and a first motor 602 drivingly engaging the first sprocket 600. According to various embodiments, the method may reduce a deviation between the first velocity of the chain 500 at the first end 202 of the frame 200 and the second velocity of the chain 500 at the second end 204 of the frame 200. More specifically, the deviation may be reduced to about 0% to about 1% of the first velocity, or to about 0.1% to about 0.9%, or to about 0.2% to about 0.8%, or to about 0.3% to about 0.7% or to about 0.4% to about 0.5% of the first velocity.

The method for chordal compensation may comprise providing a first upper chordal compensation cam 304 in the upper rail assembly 300 at the first end 202 of the frame 200 to deflect the chain 500 by a first upper variable deflection amount 314. According to such embodiments, the method may further comprise the method may comprise configuring the first upper chordal compensation cam 304 to deflect the chain 500 toward the lower rail assembly 400 by the first upper variable deflection amount 314. Similarly, the method for chordal compensation may comprise providing a first lower chordal compensation cam 404 in the lower rail assembly 400 at the first end 202 of the frame 200 to deflect the chain 500 by a first lower variable deflection amount 414. According to such embodiments, the method may further comprise configuring the first lower chordal compensation cam 404 to deflect the chain 500 toward the upper rail assembly 300 by the first lower variable deflection amount 414. The method may also comprise configuring the first upper variable deflection amount 314 and the first lower variable deflection amount 414 to reduce deviation between a first velocity of the chain 500 at the first end 202 of the frame 200 and a second velocity of the chain 500 at the second end 204 of the frame 200.

The method for chordal compensation may further comprise providing a second upper chordal compensation cam 316 in the upper rail assembly 300 at the second end 204 of the frame 200 to deflect the chain 500 by a second upper variable deflection amount 322. According to such embodiments, the method may further comprise configuring the second upper chordal compensation cam 316 to deflect the chain 500 toward the lower rail assembly 400 by the second upper variable deflection amount 322. Similarly, the method for chordal compensation may comprise providing a second lower chordal compensation cam 416 in the lower rail assembly 400 at the second end 204 of the frame 200 to deflect the chain 500 by a second lower variable deflection amount 422. According to such embodiments, the method may further comprise configuring the second lower chordal compensation cam 416 to deflect the chain 500 toward the upper rail assembly 300 by the second lower variable deflection amount 422. The method may also comprise configuring the first upper variable deflection amount 314, the second upper variable deflection amount 322, the first lower variable deflection amount 414, and the second lower variable deflection amount 422 to reduce deviation between a first velocity of the chain 500 at the first end 202 of the frame 200 and a second velocity of the chain 500 at the second end 204 of the frame 200.

The method for chordal compensation may further comprise providing a second sprocket 700 at the second end 204 of the frame 200 to engage the chain 500; providing a second motor 702 to drive the second sprocket 700; providing a controller 800 comprising a processor 802 and a memory 804 and configuring the controller 800 to adjust the second motor 702 to drive the second sprocket 700 at about the second velocity. The controller 800 may be programmed to a matching motion path, set to a specific torque profile, or tuned to be less stiff to follow the velocity of the links being driven by the first sprocket. It is preferable for the controller 800 to control the second motor 702 to match the velocity of the chain links as they are driven by the first motor 602, so both motors may apply full torque to the system at all times. The controller 800 may also cause the second motor 702 to stop the second sprocket 700 at predetermined positions. For example, the second sprocket 700 may be stopped at the 12:00 and 6:00 positions to reduce the impact speed entering the guide rails 300, 400. A specific rotary motion profile may be calculated for the second servo motor 702. In the event that only a single drive motor 602 is needed, the second servo motor 702, reducer and drive hub can be quickly and easily removed and replaced by a fixed circular guide due to the modular nature of various embodiments.

The method for chordal compensation may further comprise providing a moveable carriage 900 slidably disposed at the second end 204 of the frame 200 and supporting the second sprocket 700 and the second motor 702. The method for chordal compensation may further comprise biasing the moveable carriage 900 to move the moveable carriage 900 and thereby the second sprocket 700 and the second motor 702 in a direction away from the first sprocket 600 and the first motor 602 to add tension to the chain 500.

Unless otherwise specified, any of the components described herein may comprise any suitable material, including but not limited to metals, metal alloys, plastics, and combinations thereof.

The frame 200, for example, may be made from cast iron, or welded steel. With cast iron being preferred to reduce cost, optimize strength and reduce machine vibration. The links 502 may be made from titanium, steel, aluminum, carbon fiber or cast iron. The links 502 may preferably be made of titanium to reduce mass, increase strength, and to provide a similar degree of thermal expansion as the cast iron frame.

FIG. 15 is an example according to various embodiments illustrating a schematic diagram of a link conveyor 100. As shown, and already discussed throughout this disclosure, the link conveyor 100 may include a first sprocket 600 disposed at a first end 202 and a second sprocket 700 disposed at a second end 204. The sprockets 600, 700 may engage and drive a chain 500 in a machine direction MD or an index direction. The link conveyor 100 may include an upper rail assembly 300 and a lower rail assembly 400. The upper rail assembly 300 may comprise a first upper chordal compensation cam 304 and a second upper chordal compensation cam 316. The first upper chordal compensation cam 304 may comprise a cross sectional geometry 304c configured to deflect the chain 500 by a first upper variable deflection amount 314. The second upper chordal compensation cam 316 may comprise a cross sectional geometry 316c configured to deflect the chain 500 by a second upper variable deflection amount 322. The lower rail assembly 400 may comprise a first lower chordal compensation cam 404 and a second lower chordal compensation cam 416. The first lower chordal compensation cam 404 may comprise a cross sectional geometry 404c configured to deflect the chain 500 by a first lower variable deflection amount 414. The second lower chordal compensation cam 416 may comprise a cross sectional geometry 416c configured to deflect the chain 500 by a second lower variable deflection amount 422.

Figure 16:
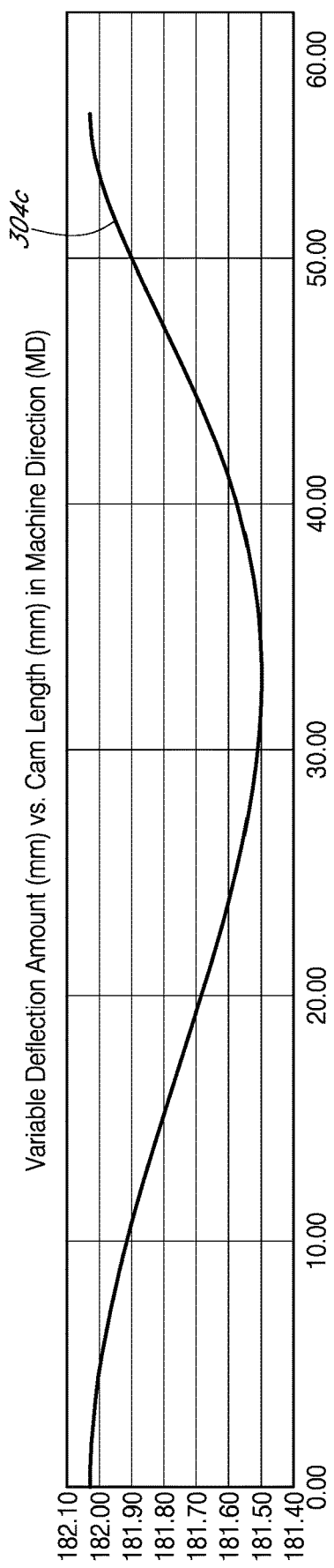
FIG. 16 is an example according to various embodiments illustrating a graph showing a calculated cross-sectional geometry of a chordal compensation cam.

Specific geometric shapes have been calculated for the chordal compensation cams. FIG. 16 is an example according to various embodiments illustrating a graph showing a calculated cross-sectional geometry 304c of the first upper chordal compensation cam 304. The graph plots the variable deflection amount in millimeters along the length of the chordal compensation cam in the machine direction in millimeters. The cross-sectional geometry 316c of the second upper chordal compensation cam 316 may be the same as or different than the specifically exemplified cross-sectional geometry 304c of the second upper chordal compensation cam 304. For example, the cross-sectional geometry 316c of the second upper chordal compensation cam 316 may be a mirror image about a vertical axis, of the cross-sectional geometry 304c of the second upper chordal compensation cam 304. The cross-sectional geometry 404c of the first lower chordal compensation cam 404 may be the same as or different than the specifically exemplified cross-sectional geometry 304c of the second upper chordal compensation cam 304. For example, the cross-sectional geometry 404c of the first lower chordal compensation cam 404 may be a mirror image about a horizontal axis, of the cross-sectional geometry 304c of the second upper chordal compensation cam 304. The cross-sectional geometry 416c of the second lower chordal compensation cam 406 may be the same as or different than the specifically exemplified cross-sectional geometry 304c of the second upper chordal compensation cam 304. For example, the cross-sectional geometry 416c of the second lower chordal compensation cam 406 may be a mirror image about a vertical axis, of the cross-sectional geometry 404c of the first lower chordal compensation cam 404 or a mirror image about a horizontal axis of the cross-sectional geometry 316c of the second upper chordal compensation cam 316.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present disclosure have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A link conveyor for an assembly machine comprising:
a frame having a first end and a second end;
an upper rail assembly, supported by the frame and comprising a first upper rail and a second upper rail, the upper rail assembly defining an upper channel;
a lower rail assembly, supported by the frame and comprising a first lower rail and a second lower rail, the lower rail assembly defining a second channel;
a chain comprising a plurality of interconnected links, each link having a body with a first bearing, a second bearing, and a third bearing disposed therein, the plurality of links being interconnected via a plurality of link pins disposed in the bearings, wherein each of the plurality of link pins comprises a first roller and a second roller sized to roll within the upper channel and the lower channel;
wherein the upper channel and the lower channel cooperatively receive the chain;
the upper rail assembly comprising a first upper chordal compensation cam, positioned at the first end of the frame, the first upper chordal compensation cam comprising a first upper deflection surface disposed on the first upper rail and a second upper deflection surface disposed on the second upper rail, wherein the first upper deflection surface and the second upper deflection surface cooperate to deflect the chain by a first upper variable deflection amount;
the lower rail assembly comprising a first lower chordal compensation cam, positioned at the first end of the frame, the first lower chordal compensation cam comprising a first lower deflection surface disposed on the first lower rail and a second lower deflection surface disposed on the second lower rail, wherein the first lower deflection surface and the second lower deflection surface cooperate to deflect the chain by a first lower variable deflection amount;
wherein the first upper variable deflection amount and the first lower variable deflection amount reduce a deviation between a first velocity of the chain at the first end of the frame and a second velocity of the chain at the second end of the frame;
a first sprocket, positioned at the first end of the frame and engaging the chain;
a first motor drivingly engaging the first sprocket;
a second sprocket, positioned at the second end of the frame and engaging the chain;
a second motor drivingly engaging the second sprocket; and
a controller comprising a processor and a memory, wherein the controller is configured to adjust the second motor to drive the second sprocket at about the second velocity.

2. The link conveyor of claim 1, wherein the first upper deflection surface and the second upper deflection surface cooperate to deflect the chain toward the lower rail assembly by the first upper variable deflection amount; and wherein the first lower deflection surface and the second lower deflection surface cooperate to deflect the chain toward the upper rail assembly by the first lower variable deflection amount.

3. The link conveyor of claim 1, wherein the upper rail assembly comprises a second upper chordal compensation cam, positioned at the second end of the frame, the second upper chordal compensation cam comprising a third upper deflection surface disposed on the first upper rail and a fourth upper deflection surface disposed on the second upper rail, wherein the third upper deflection surface and the fourth upper deflection surface cooperate to deflect the chain by a second upper variable deflection amount;
wherein the lower rail assembly comprises a second lower chordal compensation cam, positioned at the second end of the frame, the second lower chordal compensation cam comprising a third lower deflection surface disposed on the first lower rail and a fourth lower deflection surface disposed on the second lower rail, wherein the third lower deflection surface and the fourth lower deflection surface cooperate to deflect the chain by a second lower variable deflection amount;
wherein the second upper variable deflection amount and the second lower variable deflection amount further reduce the deviation between the first velocity of the chain at the first end of the frame and the second velocity of the chain at the second end of the frame.

4. The link conveyor of claim 3, wherein the third upper deflection surface and the fourth upper deflection surface cooperate to deflect the chain toward the lower rail assembly by the second upper variable deflection amount; and wherein the third lower deflection surface and the fourth lower deflection surface cooperate to deflect the chain toward the upper rail assembly by the second lower variable deflection amount.

5. The link conveyor of any one of claim 1, wherein the deviation between a first velocity of the chain at the first end of the frame and a second velocity of the chain at the second end of the frame is reduced to about 0% to about 1% of the first velocity.

6. The link conveyor of claim 1, further comprising: a moveable carriage slidably disposed at the second end of the frame and supporting the second sprocket and the second motor.

7. The link conveyor of claim 6, wherein the moveable carriage biases the second sprocket and the second motor in a direction away from the first sprocket and the first motor to add tension to the chain.

8. The link conveyor of claim 7, wherein the moveable carriage is adjustable to increase or to decrease the tension applied to the chain.

9. The link conveyor of claim 1, wherein the frame comprises a plurality of modular subunits.

10. A link conveyor for an assembly machine comprising:
a frame having a first end and a second end;
an upper rail assembly, supported by the frame and comprising a first upper rail and a second upper rail, the upper rail assembly defining an upper channel;
a lower rail assembly, supported by the frame and comprising a first lower rail and a second lower rail, the lower rail assembly defining a second channel;
a chain comprising a plurality of interconnected links;
wherein the upper channel and the lower channel cooperatively receive the chain;
the upper rail assembly comprising a first upper chordal compensation cam, positioned at the first end of the frame, the first upper chordal compensation cam comprising a first upper deflection surface disposed on the first upper rail and a second upper deflection surface disposed on the second upper rail, wherein the first upper deflection surface and the second upper deflection surface cooperate to deflect the chain by a first upper variable deflection amount;
wherein the first upper variable deflection amount reduces a deviation between a first velocity of the chain at the first end of the frame and a second velocity of the chain at the second end of the frame;
a first sprocket, positioned at the first end of the frame and engaging the chain;
a first motor drivingly engaging the first sprocket; and
a second sprocket, positioned at the second end of the frame and engaging the chain.

11. The link conveyor of claim 10, further comprising a second motor drivingly engaging the second sprocket; and a controller comprising a processor and a memory, wherein the controller is configured to adjust the second motor to drive the second sprocket at about the second velocity.

12. The link conveyor of claim 10, wherein the upper rail assembly comprises a second upper chordal compensation cam, positioned at the second end of the frame, the second upper chordal compensation cam comprising a third upper deflection surface disposed on the first upper rail and a fourth upper deflection surface disposed on the second upper rail, wherein the third upper deflection surface and the fourth upper deflection surface cooperate to deflect the chain by a second upper variable deflection amount;
wherein the lower rail assembly comprises a second lower chordal compensation cam, positioned at the second end of the frame, the second lower chordal compensation cam comprising a third lower deflection surface disposed on the first lower rail and a fourth lower deflection surface disposed on the second lower rail, wherein the third lower deflection surface and the fourth lower deflection surface cooperate to deflect the chain by a second lower variable deflection amount;
wherein the second upper variable deflection amount and the second lower variable deflection amount further reduce the deviation between the first velocity of the chain at the first end of the frame and the second velocity of the chain at the second end of the frame.

13. The link conveyor of any one of claim 10, wherein the lower rail assembly comprises a first lower chordal compensation cam, positioned at the first end of the frame, the first lower chordal compensation cam comprising a first lower deflection surface disposed on the first lower rail and a second lower deflection surface disposed on the second lower rail, wherein the first lower deflection surface and the second lower deflection surface cooperate to deflect the chain by a first lower variable deflection amount, and wherein the first lower variable deflection amount cooperates with the first upper variable deflection amount to reduce the deviation between a first velocity of the chain at the first end of the frame and a second velocity of the chain at the second end of the frame.

14. A method for chordal compensation in a link conveyor, the link conveyor comprising
a frame having a first end and a second end;
an upper rail assembly, supported by the frame and defining an upper channel;
a lower rail assembly, supported by the frame and defining a lower channel;
wherein the upper channel and the lower channel cooperate to receive a chain;
a first sprocket, positioned at the first end of the frame and engaging the chain; and
a first motor drivingly engaging the first sprocket;
the method comprising:
providing a first upper chordal compensation cam in the upper rail assembly at the first end of the frame to deflect the chain by a first upper variable deflection amount;
providing a first lower chordal compensation cam in the lower rail assembly at the first end of the frame to deflect the chain by a first lower variable deflection amount;
configuring the first upper variable deflection amount and the first lower variable deflection amount to reduce deviation between a first velocity of the chain at the first end of the frame and a second velocity of the chain at the second end of the frame;
providing a second sprocket at the second end of the frame to engage the chain;
providing a second motor to drive the second sprocket; and
providing a controller comprising a processor and a memory,
configuring the controller to adjust the second motor to drive the second sprocket at about the second velocity.

15. The method of claim 14, wherein a deviation between the first velocity of the chain at the first end of the frame and the second velocity of the chain at the second end of the frame is reduced to about 0% to about 1% of the first velocity.

16. The method of claim 14, further comprising:
configuring the first upper chordal compensation cam to deflect the chain toward the lower rail assembly by the first upper variable deflection amount; and
configuring the first lower chordal compensation cam to deflect the chain toward the upper rail assembly by the first lower variable deflection amount.

17. The method of claim 16, further comprising:
providing a second upper chordal compensation cam in the upper rail assembly at the second end of the frame to deflect the chain by a second upper variable deflection amount;
providing a second lower chordal compensation cam in the lower rail assembly at the second end of the frame to deflect the chain by a second lower variable deflection amount; and
configuring the first upper variable deflection amount, the second upper variable deflection amount, the first lower variable deflection amount, and the second lower variable deflection amount to reduce deviation between a first velocity of the chain at the first end of the frame and a second velocity of the chain at the second end of the frame.

18. The method of claim 17, further comprising:
configuring the second upper chordal compensation cam to deflect the chain toward the lower rail assembly by the second upper variable deflection amount; and
configuring the second lower chordal compensation cam to deflect the chain toward the upper rail assembly by the second lower variable deflection amount.

19. The method of any one of claim 16, further comprising providing a moveable carriage slidably disposed at the second end of the frame and supporting the second sprocket and the second motor.

20. The method of claim 19, further comprising biasing the moveable carriage and thereby the second sprocket and the second motor in a direction away from the first sprocket and the first motor to add tension to the chain.

* * * * *